UNITED STATES PATENT OFFICE.

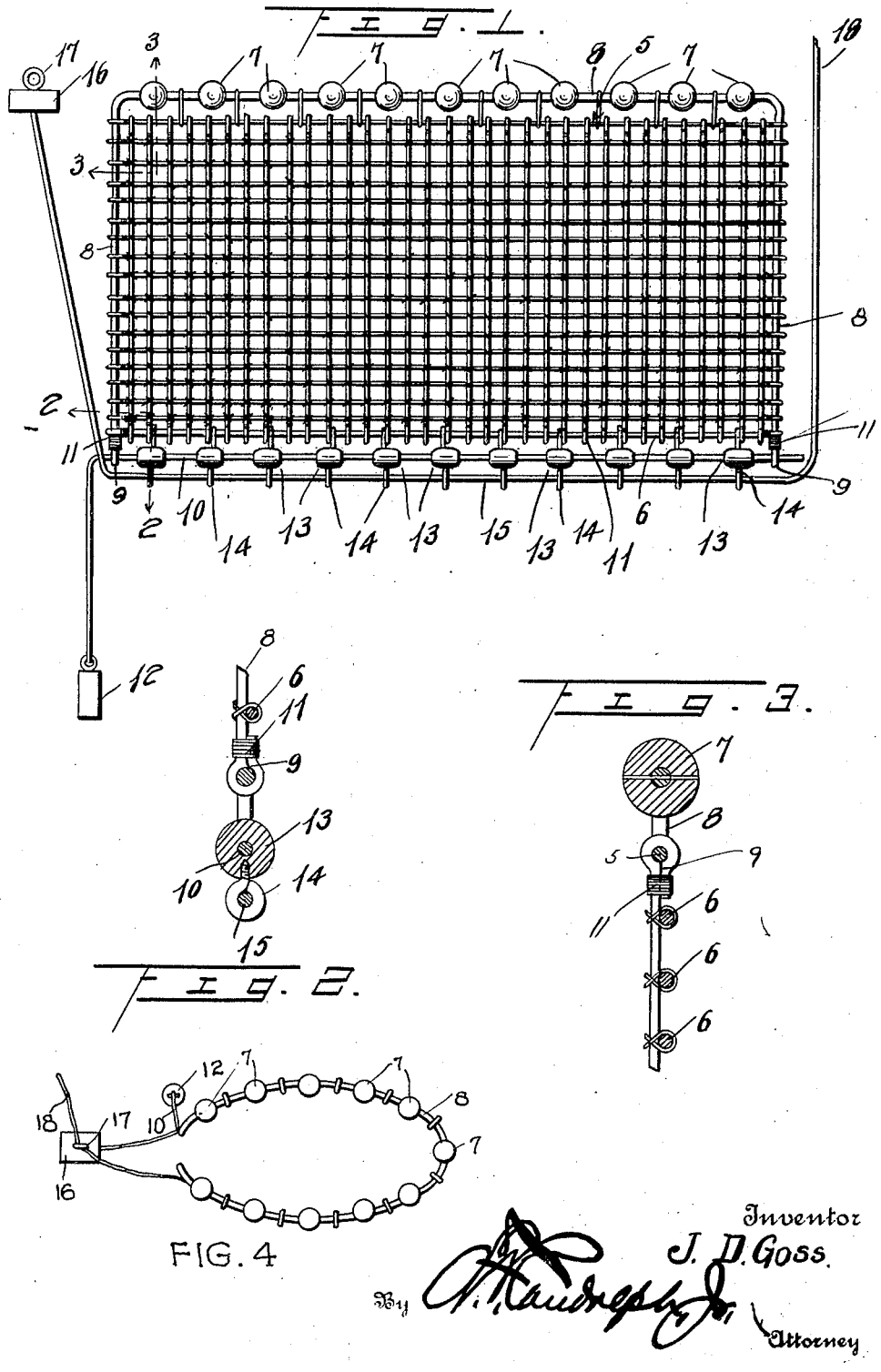

JEFF DAVIS GOSS, OF LAKE CITY, FLORIDA.

FISHING-NET.

1,341,552.     Specification of Letters Patent.     Patented May 25, 1920.

Application filed November 6, 1918. Serial No. 261,384.

*To all whom it may concern:*

Be it known that I, JEFF DAVIS GOSS, a citizen of the United States, residing at Lake City, in the county of Columbia and State of Florida, have invented certain new and useful Improvements in Fishing-Nets; and I do hereby declare the following to be a full, clear, and exact description of the invention, such as will enable others skilled in the art to which it appertains to make and use the same.

My invention relates to improvements in fishing nets, and more particularly to the rigging thereof.

An important object of this invention is to provide a fishing net adapted to be positioned vertically in the water and have one end thereof anchored, thus permitting of the outer side of the net to encircle the anchored end of the net to catch the fish within the radius of the net.

A further object of the invention is to provide a net having novel rigging means whereby the net is drawn up in a baglike form upon the completion of its encircling operation.

A further object of the invention is to provide a fish net of the character described, which is of highly simplified construction, few in parts and easy to operate.

Other objects and advantages of the invention will be apparent during the course of the following description.

In the accompanying drawing forming a part of this specification, and in which like numerals are employed to designate like parts throughout the same, Figure 1 is a side elevation of a net and associated elements embodied in the invention, Fig. 2 is a section taken on line 2—2 of Fig. 1, and Fig. 3 is a section taken on line 3—3 of Fig. 1.

Fig. 4 is a plan view of the net, showing the ends drawn together, to capture the fish.

In the drawing, wherein for the purpose of illustration is shown the preferred embodiment of my invention, the numeral 5 generically designates a net, which may be approximately one hundred and twenty-five yards long and eighteen feet deep. The net 5 may be composed of a plurality of intersecting strands of relatively hard twisted cotton twine 6. To provide for entrapping fishes of different sizes, the net is necessarily of a rather fine mesh, preferably about a one and five-eighths inch mesh. The net is supported by a plurality of spaced floats 7 arranged on a flexible element 8 secured to one end of the net, as clearly shown. The flexible element 8 extends along the side edges of the net 5, and has its end portions bent upon itself to provide eyelets 9 for the reception of an anchor line 10. Twine 11 may be wrapped around the end portions of the flexible elements 8 and the vertical strands of the net 5. Secured to the lower end of the anchor line 10 is an anchor 12, adapted to retain one end of the net in a relatively set position. The anchor line 10 extends through a plurality of sinker elements 13 disposed along the lower end of the net 5. The anchor line 10 is adapted to extend to a dory or other small boat and controlled therefrom. The sinker elements 13 carry depending eyelets 14, receiving a drawline 15. One end portion of the drawline 15 is connected to a float element 16. An eyelet 17 is provided on the float 16, and is adapted for the reception of the opposite end 18 of the drawline 15.

In setting my improved net, the anchor 12 is dropped in the water and rests upon the bottom. The float element 16 is positioned above the anchor 12. The net 5 is now encircled about the anchor 12 and the float element 16. Upon the completion of the encircling operation, the end portion 18 of the drawline 15 is passed through the eye 17, thus drawing the net up into a baglike form. It will be apparent that the lower end of the net 5 will be arranged forwardly of the top of the net, thus serving to prevent the escape of the fish through the bottom upon the pulling up of the net. Upon the completion of the pulling together of the net, the fish will be gathered within a relatively small space in the net and their easy removal is thus permitted.

While I have shown and described the preferred embodiment of my invention, it is understood that I may make such minor changes in arrangement and construction of parts, as will remain within the spirit of the invention and the scope of the appended claims.

Having thus described my invention, what I claim is:

1. An apparatus of the character described comprising, a net adapted to be placed vertically in the water; a plurality of floats secured to the upper end of the net to support the same; an anchor line secured to the lower end of the net; an anchor secured to the anchor line; a plurality of sinker elements arranged on the anchor line and disposed in line with the net; eyelets secured to the sinker elements; a drawline extending through the elements; and a float element rigidly secured to one end of the drawline and adapted to be slidably engaged with the free end of the drawline after the net has been set.

2. An apparatus of the character described comprising, a net adapted to be placed vertically in the water, a plurality of floats secured to the upper end of the net to support the same; an anchor line secured to the lower end of the net; an anchor secured to the anchor line; a drawline having sliding engagement with the lower portion of the net; and a float element rigidly secured to the drawline and adapted to be slidably engaged with the free end of the drawline after the net has been set.

3. The combination with a fishing net, of a weighted line secured to the lower longitudinal edge of the net and extending parallel thereto, a draw line having slidable engagement with lower longitudinal edge of the net, a float fixed to one end of the drawline, the opposite end of the drawline being adapted to be slidably engaged with the float whereby to gather the net.

In testimony whereof I affix my signature in presence of two witnesses.

JEFF DAVIS GOSS.

Witnesses:
H. L. Lacquey,
B. F. Ray.